(12) United States Patent  
Okazaki et al.

(10) Patent No.: US 7,757,246 B2  
(45) Date of Patent: Jul. 13, 2010

(54) DISC APPARATUS WITH CLAMP HOLDER HAVING TOP SURFACE OF FIRST FLANGE HIGHER THAN TOP SURFACE OF SECOND FLANGE

(75) Inventors: Nobuyuki Okazaki, Daito (JP); Ryuuji Hayashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1037 days.

(21) Appl. No.: 11/482,766

(22) Filed: Jul. 10, 2006

(65) Prior Publication Data

US 2007/0011696 A1    Jan. 11, 2007

(30) Foreign Application Priority Data

Jul. 11, 2005   (JP)  ............................. 2005-201836

(51) Int. Cl.
    *G11B 17/03*   (2006.01)
(52) U.S. Cl. .................................................. 720/710
(58) Field of Classification Search ................ 720/710, 720/706, 703, 713, 714, 695, 658; 369/258.1, 369/262, 270.1
    See application file for complete search history.

(56) References Cited

U.S. PATENT DOCUMENTS 6,298,032 B1    10/2001  Yamada et al. ............... 720/716

7,080,389 B2 *   7/2006  Lu ................................ 720/604
2002/0024921 A1*  2/2002  Sogawa et al. ............... 369/270
2007/0083881 A1*  4/2007  Yeh et al. ..................... 720/706

FOREIGN PATENT DOCUMENTS

| EP | 1 296 323 | 3/2003 |
| JP | 62-198553 U | 12/1987 |
| JP | 08-167206 | 6/1996 |
| JP | 2000-187911 A | 7/2000 |
| JP | 2002-334495 A | 11/2002 |
| JP | A-2003-308640 | 10/2003 |
| JP | A-2004-118897 | 4/2004 |

OTHER PUBLICATIONS

"flange", Oxford English Dictionary, Second Edition 1989.*

* cited by examiner

*Primary Examiner*—Julie Anne Watko
(74) *Attorney, Agent, or Firm*—Morgan Lewis & Bockius LLP

(57) ABSTRACT

When a motor rotates and a traverse mechanism integrated with a turntable pivots, a clamper holder moves downward together with the turntable whereby an end part of a first flange of the clamp holder abuts the bottom surface of a flange provided at an outer peripheral edge part at the upper end side of the clamper. The first flange is so arranged at the side opposite to the pivoting axis of the traverse mechanism as viewed from the center of the clamper. Further downward movement of the turntable separates the clamper from the turntable in such a manner as to leave the clamper in the clamper holder.

3 Claims, 6 Drawing Sheets

DISC APPARATUS WITH CLAMP HOLDER HAVING TOP SURFACE OF FIRST FLANGE HIGHER THAN TOP SURFACE OF SECOND FLANGE

This application is based on Japanese Patent Application No. 2005-201836 filed on Jul. 11, 2005, the contents of which are hereby incorporated by reference.

BACKGROUND OF THE INVENTION

1. Field of the Invention

The present invention relates to a disc apparatus that performs information recording or reproduction on a disc recording medium, such as a CD, a DVD, or the like, and more specifically to the fitting structure of a clamper.

2. Description of Related Art

There is a disc apparatus, known as a conventional disc apparatus, which, when a disc tray loaded with a disc recording medium transfers into the main body, clamps and holds the disc recording medium between a clamper and a turntable provided in the main body to perform information recording or reproduction on the disc recording medium. Further, in recent years, various apparatuses with reduced load of operation of separating a clamper from a turntable, that is, unclamping operation have been suggested.

For example, in an optical disc drive device disclosed in JP-A-2004-118897, when a clamper moves downward in conjunction with the downward movement of a spindle motor, an anti-falling flange part of the clamper is brought into partial contact with the holding surface of a clamper holder. This separates the clamper at the partial contact part from the turntable without imposing a large load thereon. As a result, load imposed on a loading motor is reduced, and the disc recording medium is easily ejected.

More specifically, the holding surface of the clamper holder is inclined with respect to the disc recording medium located at the loading position. With this configuration, the clamper and the clamper holder abut each other at one point at the initial stage of unloading. Therefore, based on the principle of the lever, a force required for separating the clamper from the turntable becomes smaller compared to when the holding surface of the clamper holder is in parallel to the disc recording medium.

JP-A-2003-308640 discloses a clamping mechanism of a disc apparatus capable of separating a clamper from a turntable with a small force against magnet attraction. More specifically, at unclamping operation, a projection or bump provided in a flange of a clamper holder opposing a flange of the clamper is so configured as to lift up the position located off the clamper center.

However, the configuration disclosed in JP-A-2004-118897 requires a large space for the holding surface of a clamper holder in the height direction thereof in order to incline the clamper by a desired angle at unloading, which is disadvantageous in terms of slimming down of the apparatus. The configuration disclosed in JP-A-2003-308640 corresponds to a disc apparatus of the type that performs unclamping and clamping by opening and closing a cover, and thus cannot be applied directly to a disc apparatus of the type that performs unclamping and clamping by moving a turntable on a traverse mechanism upward and downward. In addition, a conventional general structure suffers from problems, such as a small degree of freedom in the fitting method; large operation sound generated when a voltage is increased to ensure the unclamping operation against magnet attraction; and the like.

SUMMARY OF THE INVENTION

It is an object of the present invention to provide a disc apparatus, configured to perform clamping and unclamping by moving a turntable on a traverse mechanism upward and downward, which is capable of reducing a load at unclamping and also achieving slimming down of the apparatus.

A disc apparatus according to one aspect of the invention, when a tray loaded with a disc recording medium transfers into an apparatus main body, clamps the disc recording medium and performs information recording or reproduction on the disc recording medium. The disc apparatus includes: a chassis fixed to the apparatus main body; a traverse mechanism capable of, by driving of a motor, moving upward and downward, via a plurality of gears, in a predetermined direction with respect to the chassis; a clamper for clamping the disc recording medium with a turntable provided in the traverse mechanism; and a clamper holder for rotatably holding the clamper provided in the apparatus main body. There are provided a first and a second flanges which extend inward from the inner peripheral edge parts at the lower end of the clamper holder and which are divided into a front and a rear, respectively. The first and second flanges are so arranged as to oppose a flange of the clamper with a predetermined bump being provided so that the top surface of the first flange is higher than the top surface of the second flange. A right and a left circumferential end parts of the first flange are separated by a predetermined offset distance from a horizontal straight line passing through the center of the clamper holder. When the disc recording medium is unclamped, the end part of the first flange abuts the bottom surface of the flange of the clamper.

It is preferable that the first flange be arranged at the side opposite to the pivoting axis of the traverse mechanism as viewed from the center of the clamper.

According to the invention, with configuration that clamping and unclamping are performed by moving a turntable on a traverse mechanism upward and downward, a disc apparatus can be provided which is capable of reducing an unclamping load and also achieving slimming down of the apparatus.

DESCRIPTION OF THE PREFERRED EMBODIMENTS

Figure 1:
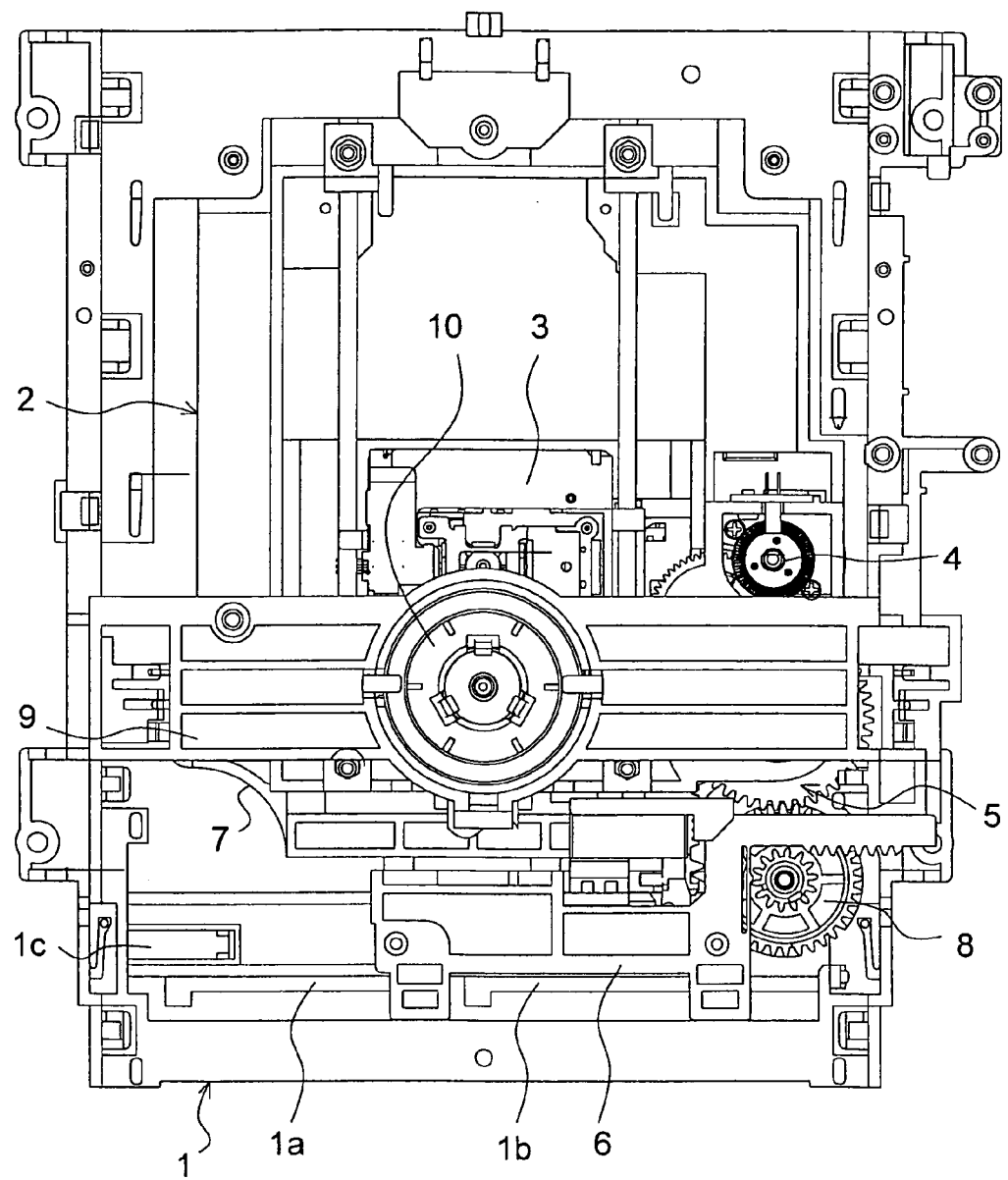
FIG. 1 is a plan view showing a disc loader of a disc apparatus according to an embodiment of the invention.
Figure 2:
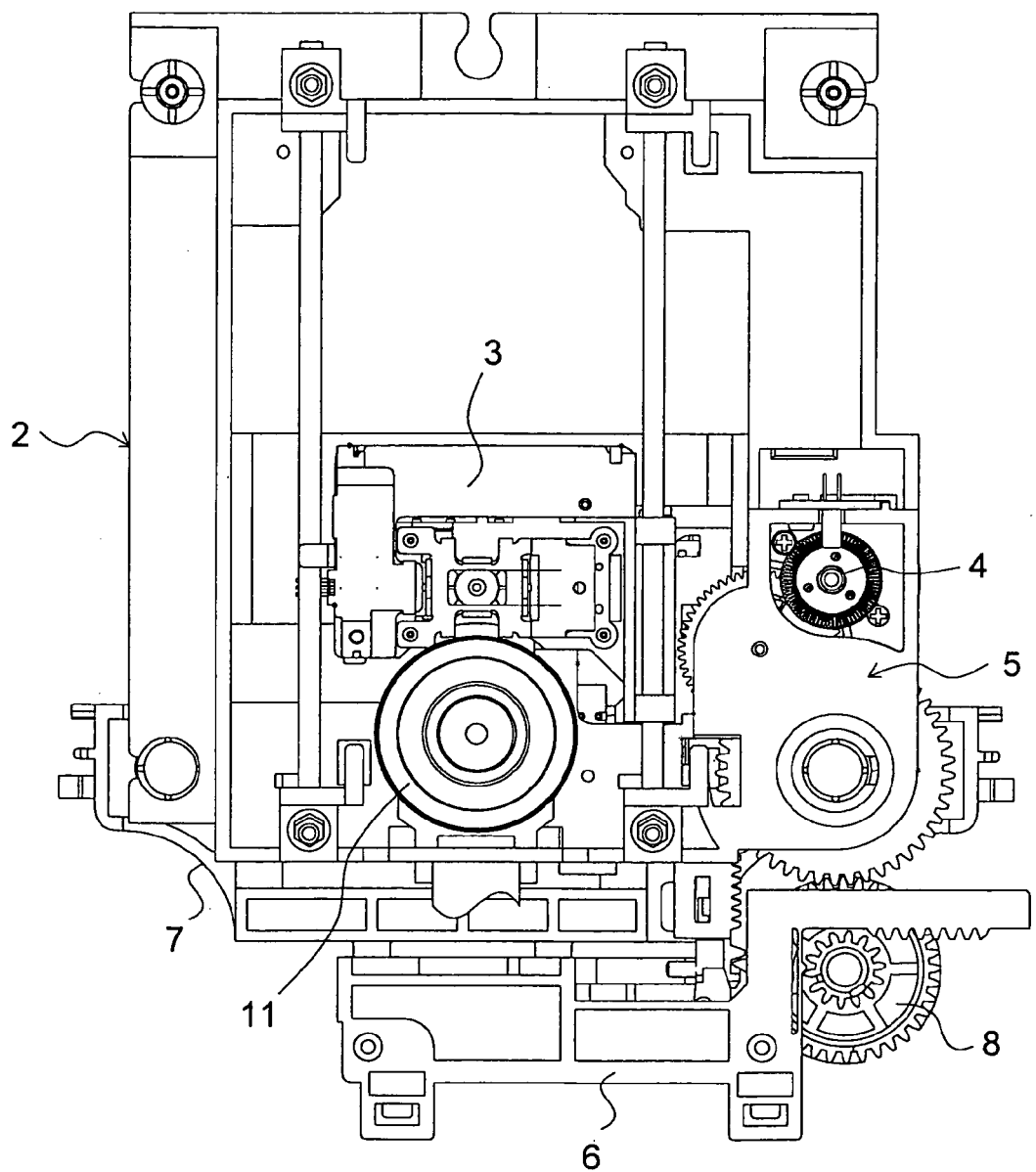
FIG. 2 is a plan view mainly showing a traverse mechanism of the disc apparatus.

Hereinafter, an embodiment of the present invention will be described with reference to the accompanying drawings. FIG. 1 is a plan view showing a disc loader of a disc apparatus according to the embodiment of the invention. FIG. 2 is a plan view mainly showing a traverse mechanism of the disc apparatus. This disc apparatus has a loader chassis 1 and a traverse mechanism 2 provided therein. The traverse mechanism 2 is capable of moving upward and downward while turning in the direction substantially perpendicular to the conveyance direction (anteroposterior direction) of a tray (not shown) conveying a recording medium. The loader chassis 1 is fixed to an apparatus main body (not shown).

The traverse mechanism 2 is provided with: a pickup unit 3 having an optical pickup that performs recording or reproduction on the disc recording medium, and a motor 4 that transfers the pickup unit 3 radially of the disc recording medium. To the motor 4, transmission means 5 composed of a plurality of flat gears is fitted. The transmission means decelerates and transmits a drive force of the motor 4. The meshing of the transmission means 5 with a rack (not shown) formed in the pickup unit 3 causes the motor 4 to drive and transfer the pickup unit 3.

The transmission means 5 meshes with a tray gear 8 located to the front thereof, and the tray gear 8 can mesh, at the front of the traverse mechanism 2, with a cam slider 6 disposed at the loader chassis 1 side. The cam slider 6 engages with a shift lever 7 provided at the front part of the traverse mechanism 2, and is transferable in the direction (horizontal direction) substantially orthogonal to the conveyance direction of the tray (anteroposterior direction) and also to the direction of upward and downward movement by the traverse mechanism 2. This permits the traverse mechanism 2 to move upward and downward. Moreover, the tray gear 8 can mesh with a rack formed in the tray, and thus the tray gear 8 and the tray couple with each other at a predetermined timing, whereby the drive force of the motor 4 is transmitted to the tray.

In the disc apparatus with the configuration described above, when the disc recording medium is loaded onto the tray, the tray is conveyed into the disc loader by driving of the motor 4. When the tray is disposed at a predetermined position, the coupling between the tray and the tray gear 8 is released, and the cam slider 6 and the tray gear 8 are coupled with each other. The cam slider 6 transfers in the direction (horizontal direction) perpendicular to the conveyance direction of the tray to thereby move the traverse mechanism 2 upward. As a result, the traverse mechanism 2 engages with the disc recording medium to chuck the disc recording medium.

Hereinafter, the chuck part of the disc recording medium will be described in detail. Horizontally across the upper side of the loader chassis 1, a clamper holder 9 shaped in a substantially long plate form is installed, on the center of which a clamper 10 shaped in a substantially discoid form is provided in a freely rotatable manner. On the other hand, a turntable 11, driven into rotation by a spindle motor M shown in FIG. 3 to be described later or the like, projects upward from the traverse mechanism 2. At the time of chucking of the disc recording medium described above, the traverse mechanism 2 moves upward whereby the center hole of the disc recording medium fits with the turntable 11. Further upward movement of the traverse mechanism 2 causes the disc recording medium to be sandwiched between the turntable 11 and the clamper 10.

When the disc recording medium is chucked, the coupling between the tray gear 8 and the cam slider 6 is released, and the transmission means 5 is coupled with the pickup unit 3. As a result, the pickup unit 3 can transfer radially of the disc recording medium, thereby permitting recording or reproduction at a predetermined position of the disc recording medium. To take out the disc recording medium, operation opposite to the one described above is to be performed. Hereinafter, the disc clamping structure of the disc apparatus of the invention will be described.

Figure 3:
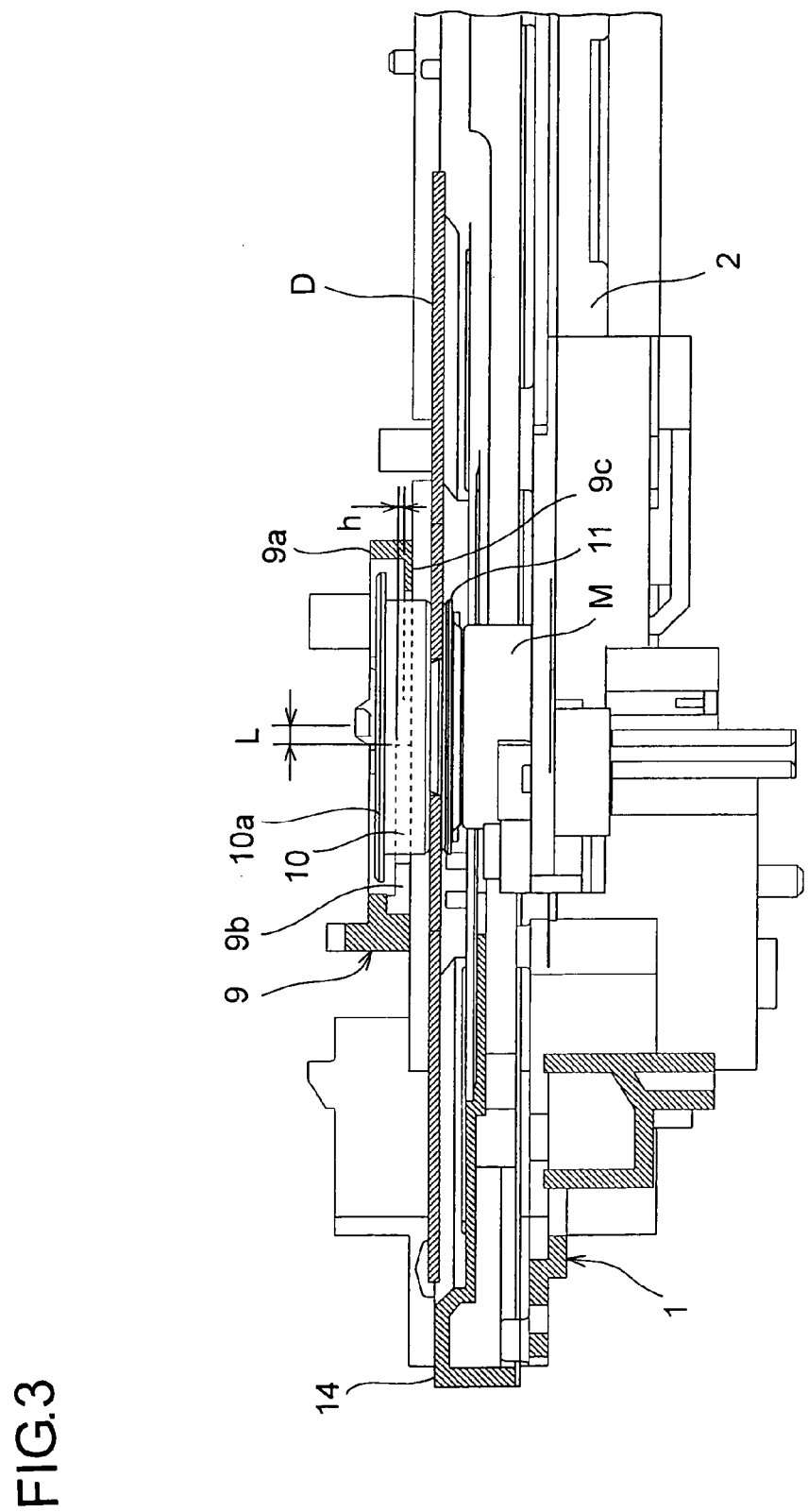
FIG. 3 is a sectional view showing a clamping mechanism with a disc in a clamped state.
Figure 4:
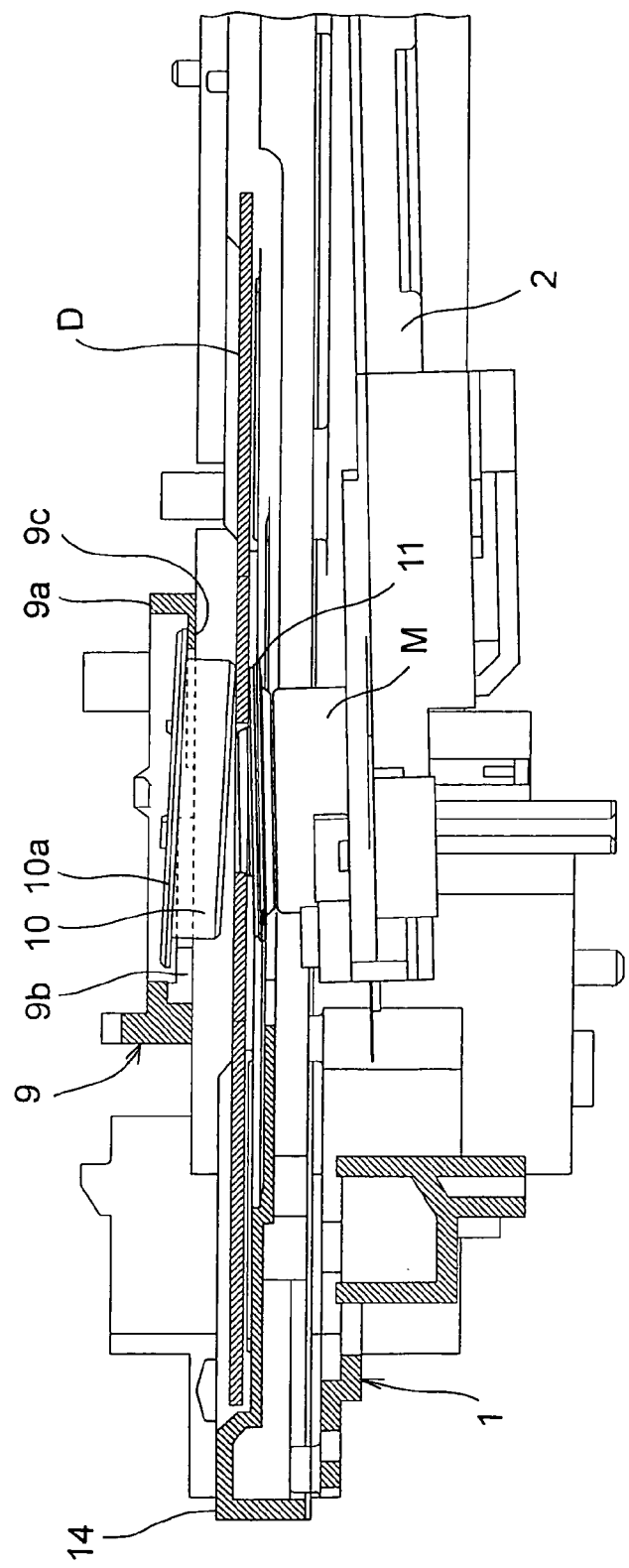
FIG. 4 is a sectional view showing the clamping mechanism with the disc in process of being unclamped.
Figure 5:
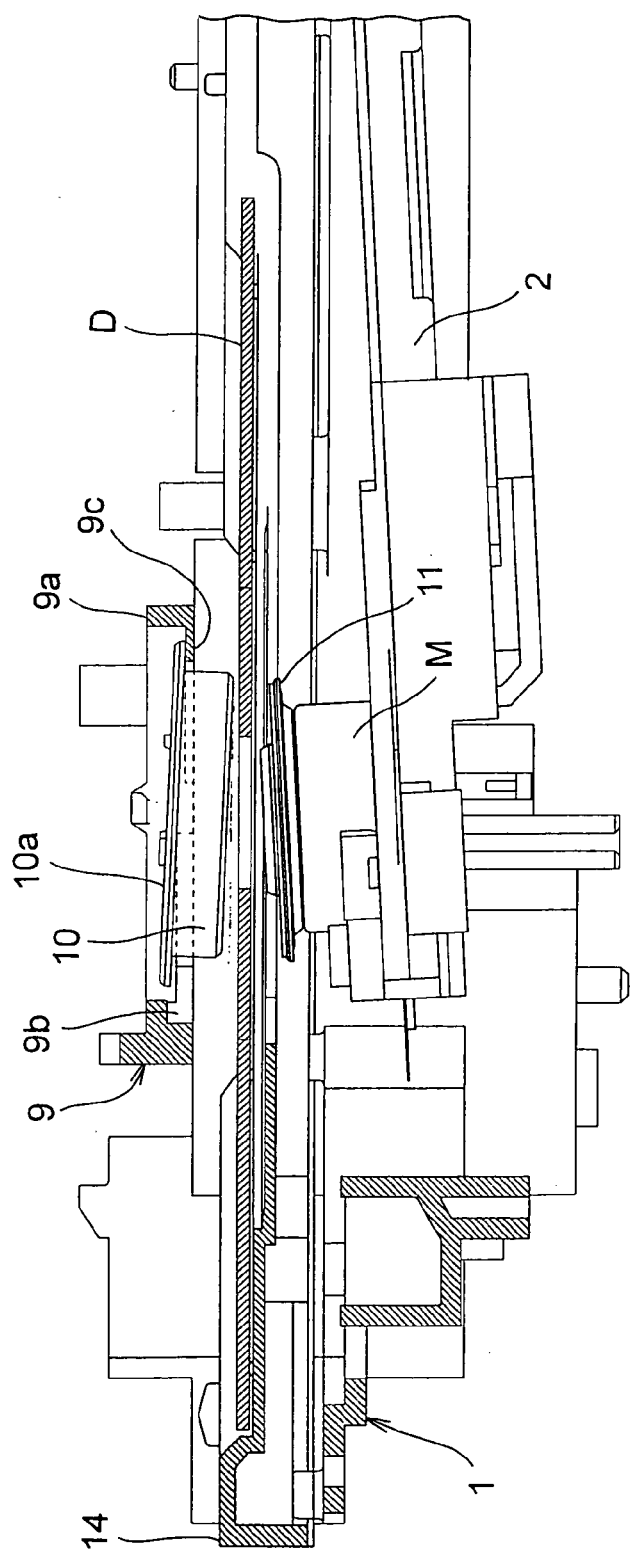
FIG. 5 is a sectional view showing the clamping mechanism with the disc completely unclamped.
Figure 6:
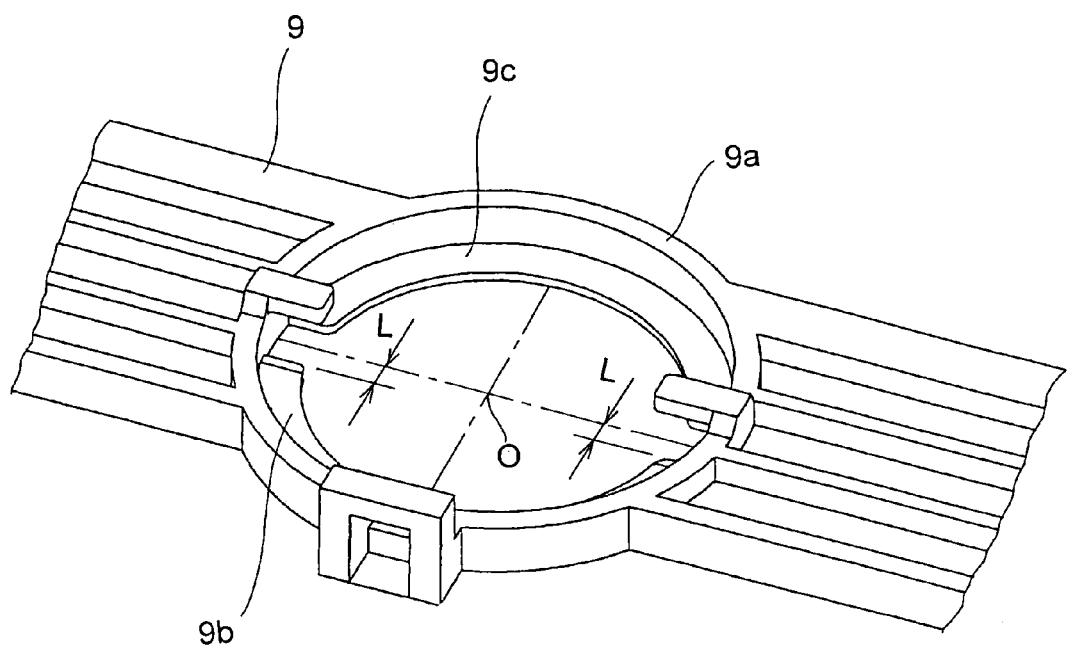
FIG. 6 is a perspective view showing a clamper holder of the clamping mechanism.

FIG. 3 is a sectional view showing the clamping mechanism of the disc apparatus according to the embodiment with a disc in a clamped state. FIG. 4 is a sectional view showing the same clamping mechanism with the disc in process of being unclamped. FIG. 5 is a sectional view showing the same clamping mechanism with the disc completely unclamped. FIG. 6 is a perspective view showing the clamper holder of the same clamping mechanism.

The clamper holder 9 in this embodiment has, as shown in detail in FIG. 6, a holder part 9a formed in a toric shape arranged at the center, and a first and a second flanges 9b and 9c which extend inward from the inner peripheral edge parts at the lower end of the holder part 9a and which are arranged at the front and the rear, respectively. The left and right circumferential end parts of the first and second flanges 9b and 9c are located a little apart forward and rearward, respectively, from a horizontal straight center line passing through a center O of the holder part 9a. A distance between either of the left and right circumferential end parts of the flange 9b located at the front and the horizontal straight center line passing through the center O of the holder part 9a is defined as an off set distance L.

Moreover, as described later, the top surface of the first flange 9b is designed to be slightly higher than the top surface of the second flange 9c. This difference is defined as a bump h (not shown in FIG. 6). In order to improve the degree of freedom in the shape to be machined, this clamper holder 9 in this embodiment is structured to be integrated with the loader chassis 1 described above with resin material.

FIG. 3 shows the state in which the disc recording medium D is clamped, in which state the clamper 10 is suctioned by a magnet (not shown) provided in the turntable 11, and thus is separated from the clamper holder 9. FIG. 3 shows the off set distance L, described above, between the center of the holder part 9a and the end part of the first flange 9b, and the bump h between the top surface of the first flange 9b and the top surface of the second flange 9c. Numeral 14 denotes a tray that loads and conveys the disc recording medium D.

Next, when the motor 4 shown in FIGS. 1 and 2 is driven, as shown in FIG. 4, the traverse mechanism 2 integrated with the turntable 11 pivots, and the clamper 10 moves downward together with the turntable 11. Then, the end part of the first flange 9b of the clamper holder 9 abuts the bottom surface of a flange 10a provided at the outer peripheral edge part at the upper end side of the clamper 10. The first flange 9b is arranged at a side opposite to the pivoting axis of the traverse mechanism 2 (located at the right hand side of FIG. 4) and is located off the center of the clamper 10 by the substantially offset distance L. Then, further downward movement of the turntable 11 separates the clamper 10 from the turntable 11 in such a manner as to leave the clamper 10 in the clamper holder 9.

Finally, as shown in FIG. 5, further pivoting of the traverse mechanism 2 causing downward movement of the turntable 11 completely separates this from the clamper 10 and the disc recording medium D, thereby ending the unclamping operation. Thus, the clamper 10 is separated from the turntable 11 in such a manner as to be inclined thereto, thus permitting the unclamping with a small force. This therefore reduces the load of the drive mechanism of the traverse mechanism 2 and the motor 4 described above, and also reduces the shock generated when the clamper 10 separates from the turntable 11.

Further, the bump h between the top surface of the first flange 9b and the top surface of the second flange 9c may be set at a degree that permits obtaining a substantially desired inclination with respect to a sum of the off set distance L described above and the radius of flange 10a. In this case, due to the bump around the center, the angle of the clamper can easily be provided. In addition, this bump h can be small-scaled, thanks to the inclination provided by the pivoting of the traverse mechanism 2. Therefore, the clamper holder and further the entire apparatus can be slimmed down by implementing the invention.

What is claimed is:

1. A disc apparatus which, when a tray loaded with a disc recording medium transfers into an apparatus main body, clamps the disc recording medium and performs information recording or reproduction on the disc recording medium, the disc apparatus comprising:

a chassis fixed to the apparatus main body;

a traverse mechanism capable of, by driving of a motor, moving upward and downward, via a plurality of gears, in a predetermined direction with respect to the chassis;

a pickup unit having an optical pickup, provided in the traverse mechanism, and capable of, by the driving of the motor, transferring in a direction substantially orthogonal to a direction in which the traverse mechanism moves upward and downward;

a clamper for clamping, by a magnetic force, the disc recording medium with a turntable provided in the traverse mechanism; and a clamper holder for rotatably holding the clamper provided in the apparatus main body, wherein a first and a second flanges are provided which extend inward from inner peripheral edge parts at a lower end of the clamper holder and which are divided into a front and a rear, respectively, the first and second flanges being so arranged as to oppose a flange of the clamper with a predetermined bump being provided so that a top surface of the first flange is higher than a top surface of the second flange, a right and a left circumferential end parts of the first flange being separated by a predetermined offset distance from a horizontal straight line passing through a center of the clamper holder, and wherein, when the disc recording medium is unclamped, the end part of the first flange abuts a bottom surface of the flange of the clamper, the first flange being arranged at a side opposite to a pivoting axis of the traverse mechanism as viewed from the center of the clamper.

2. A disc apparatus which, when a tray loaded with a disc recording medium transfers into an apparatus main body, clamps the disc recording medium and performs information recording or reproduction on the disc recording medium, the disc apparatus comprising:

a chassis fixed to the apparatus main body;

a traverse mechanism capable of, by driving of a motor, moving upward and downward, via a plurality of gears, in a predetermined direction with respect to the chassis;

a clamper for clamping the disc recording medium with a turntable provided in the traverse mechanism; and a clamper holder for rotatably holding the clamper provided in the apparatus main body, wherein a first and a second flanges are provided which extend inward from inner peripheral edge parts at a lower end of the clamper holder and which are divided into a front and a rear, respectively, the first and second flanges being so arranged as to oppose a flange of the clamper with a predetermined bump being provided so that a top surface of the first flange is higher than a top surface of the second flange, a right and a left circumferential end parts of the first flange being separated by a predetermined offset distance from a horizontal straight line passing through a center of the clamper holder, and wherein, when the disc recording medium is unclamped, the end part of the first flange abuts a bottom surface of the flange of the clamper.

3. The disc apparatus according to claim 2, wherein the first flange is arranged at a side opposite to a pivoting axis of the traverse mechanism as viewed from the center of the clamper.

* * * * *